United States Patent [19]
Hochberg

[11] Patent Number: 5,165,394
[45] Date of Patent: Nov. 24, 1992

[54] EMERGENCY LIFE SUPPORT UNIT

[75] Inventor: Jerome Hochberg, Wilmington, Del.

[73] Assignee: E. I. Du Pont de Nemours and Company, Wilmington, Del.

[21] Appl. No.: 661,480

[22] Filed: Jan. 16, 1991

Related U.S. Application Data

[63] Continuation of Ser. No. 498,442, Mar. 22, 1990, abandoned, which is a continuation of Ser. No. 228,060, Aug. 4, 1988, abandoned.

[51] Int. Cl.⁵ .................................................. A62B 7/10
[52] U.S. Cl. ........................ 128/201.25; 128/205.12; 128/205.28
[58] Field of Search ................. 128/202.26, 205.12, 128/205.28, 201.25; 55/68, 524

[56] References Cited

U.S. PATENT DOCUMENTS

| | | | |
|---|---|---|---|
| 2,578,523 | 12/1951 | Llewellyn | 18/55 |
| 3,800,516 | 4/1974 | Paluch | 128/205.28 |
| 3,838,064 | 9/1974 | Vogt et al. | 252/384 |
| 3,838,092 | 9/1974 | Vogt et al. | 260/33.6 F |
| 3,993,584 | 11/1976 | Owen et al. | 252/383 |
| 4,627,431 | 12/1986 | Werjefelt | 128/201.25 |

Primary Examiner—Edgar S. Burr
Assistant Examiner—Aaron J. Lewis

[57] ABSTRACT

A hood for providing a user with breathable air having $CO_2$ absorption means disposed therein, in which the absorption means is intimately admixed with a fibrous material.

11 Claims, 2 Drawing Sheets

EMERGENCY LIFE SUPPORT UNIT

This application is a continuation of application Ser. No. 07/498,442 filed Mar. 22, 1990 which is a continuation of Ser. No. 07/228,060 filed Aug. 4, 1988, both now abandoned.

BACKGROUND OF THE INVENTION

A wide variety of emergency breathing equipment has previously been developed, such as the protective hood with $CO_2$ absorbant described in Werjefelt, U.S. Pat. No. 4,627,431, and the multilayered hood with elastomeric neck seal described in copending, coassigned U.S. application Ser. No. 120,533, filed Nov. 13, 1987. This type of equipment generally includes a protective hood, a source of oxygen and a means to remove, from the hood interior, the carbon dioxide exhaled by the wearer.

Lithium hydroxide (LiOH) is one compound commonly used to absorb the carbon dioxide. LiOH is often preferred as an absorbent because it provides acceptable absorption characteristics with acceptable weight. Particularly in aircraft applications, weight is an important consideration.

Lithium hydroxide is readily available in powder form, which provides a surface area that maximizes its effectiveness as an absorbant. However, the powder dust is a respiratory irritant, and should therefore be isolated from the wearer.

Previously, scrubbers were constructed by impregnating felt with LiOH powder by putting the two together in a ball mill. The resulting loaded felt was encased in an envelope of semipermeable membrane that allowed gas flow through the envelope while retaining the LiOH. Heat sealing of such envelopes was also used to maintain the uniform distribution of the LiOH powder within the envelopes.

While such previous techniques and designs were satisfactory, continuing effort has been devoted to a $CO_2$ absorbant system that would provide improved balance among maximum absorption, isolation from the wearer, ease of manufacture and low cost and weight.

SUMMARY OF THE INVENTION

The present invention provides a protective hood having a $CO_2$ absorbant which is easily and economically manufactured, and provides uniform distribution of absorbant, excellent absorption capability and isolation of the absorbant from the user.

Specifically, the present invention provides, in a protective hood for providing a user with breathable air which envelopes at least the head of the user and contains $CO_2$ absorption means disposed inside the hood, the improvement wherein the $CO_2$ absorption means is uniformly admixed with about from 0.1 to 70%, by weight of the mixture, of a fibrous material, and the $CO_2$ absorption means is disposed in the form of a sheet having a thickness of about from 1 to 25 mm.

DETAILED DESCRIPTION OF THE INVENTION

Figure 3:
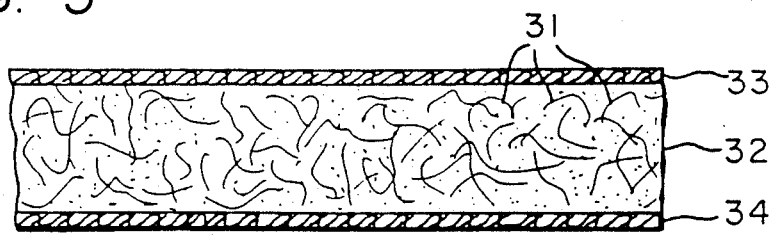
FIG. 3 is a cross-sectional view of the preferred $CO_2$ absorption means used in the present invention.

The protective hoods of the present invention can be constructed according to the general configuration, and with the materials specified in, the aforementioned Werjefelt, U.S. Pat. No. 4,627,431, and copending, coassigned U.S. application Ser. No. 120,533, filed Nov. 13, 1987, both of which are hereby incorporated by reference.

The present invention resides in the provision of a $CO_2$ absorption means which is compounded with a fibrous material, to uniformly and intimately admix the absorption means with the fibrous material. This compounding stabilizes the $CO_2$ absorption means, reducing dusting and the possibility of irritation of the user. A wide range of compositions of the $CO_2$ absorption means and the fibrous material can be used, in that the fibrous material can comprise about from 0.1 to 70% by weight of the mixture. Preferably, the fibrous material comprises about from 0.5 to 50% by weight of the mixture, and especially about from 1 to 10%.

$CO_2$ absorption means which can be used in the present invention include alkali and alkaline earth metal hydroxides and oxides, such as calcium hydroxide, calcium oxide, sodium hydroxide and barium hydroxide. Of these, the lithium and sodium salts are preferred, and lithium hydroxide is particularly preferred. In general, for the best balance of handling and absorption characteristics, lithium hydroxide having a particle size of about from 5 to 250 microns is used.

The $CO_2$ absorption means is admixed, or compounded, with any fibrous material that can be laid down in a mat or sheet by wet or dry techniques. Fibrous materials which can be used include polymeric fibers such as polyolefins, polyesters, and polyamides with fiber lengths in the range of about from 0.1 to 3 inches. Inorganic fibers can also be used.

Fibrous materials which are preferred in the present invention are fluorocarbons, such as polytetrafluoroethylene. That commercially available from E. I. du Pont de Nemours and Co. as "Teflon TFE3512", when formed into fibrids, has been found to be particularly satisfactory. Other fluorocarbons which can be used include that commercially available from E. I. du Pont de Nemours and Co. as Teflon K10 fluoropolymer. A preferred polypropylene which can be used is that commercially available from E. I. du Pont de Nemours and Co. in the form of polypropylene fibrids as "Pulp Plus."

The fibrous material can either be used in a fibrilated form or it can be simultaneously fibrilated and compounded with the $CO_2$ absorbant. While the use of prefibrilated material, such as the polypropylene fibrids noted above, is satisfactory, it is preferred to simultaneously fibrilate the material and compound it with the $CO_2$ absorption means. This simultaneous fibrilation and compounding results in a greater degree of encapsulation of the absorbant, and a more stable structure.

After compounding of the $CO_2$ absorption means with the fibrous material, it is cast into sheet form. Generally, the compounded material is dispersed in a fluid to facilitate casting. Fluids which can be used include any that do not dissolve the fibrous material or the $CO_2$ absorption means under the conditions used, such as aliphatic and aromatic hydrocarbon solvents. Naptha, however, is a preferred dispersion aid. The dispersion can be cast into sheet form using conventional papermaking techniques.

In the alternative, the compounded $CO_2$ absorption means can be pelletized and incorporated into a sheet structure by dry techniques. For example, the pellitized $CO_2$ absorption means can be spread between two sheets of permeable membrane and then needle-punched for structural integrity.

Regardless of whether a wet or dry preparation method is used, the absorbant and the fibrous material in the sheets of $CO_2$ absorption means are uniformly admixed. For example, in a four square inch sheet of the absorption means, the relative concentration of the absorbant and the fibrous material will generally not vary more than about 20% by volume.

It is preferred that a $CO_2$ permeable membrane be bonded to at least one surface of the compounded $CO_2$ absorption means, and especially to both surfaces. It has been found that these layers improve the overall strength of the absorbant structure. A wide variety of membranes can be used, so long as the membrane does not significantly inhibit air flow through the absorbant. The fabric preferably has a pore size of at least about 0.1 micron. A particularly satisfactory material is that commercially available from E. I. du Pont de Nemours and Co. as Nomex hydrolaced fabric.

The membrane or fabric can be applied to the compounded $CO_2$ absorption means before or after formation of the sheet. For example, the absorbant sheet can be cast onto a layer of permeable fabric from a dispersion.

The $CO_2$ absorbant sheet is preferably treated to impart three dimensional integrity. Ultrasonic bonding, heat bonding, stitching or hydrolacing with an appropriate liquid can be so used to advantage. However, needling with conventional apparatus such as a needleloom, used for felting, is preferred for such treatment.

In the preferred manufacturing techniques used in the present invention, LiOH powder is combined with a high-fibrillating fluoropolymer in a high shear mixer which results in a dustless mass of material. This mass is dispersed in non-solvent using a high shear mixer and the slurry is deposited onto a permeable sheet using traditional paper making equipment. The resulting sheet is dried and a second permeable sheet is put on top and the entire sandwich is mechanically needled using a needleloom.

Figure 1:
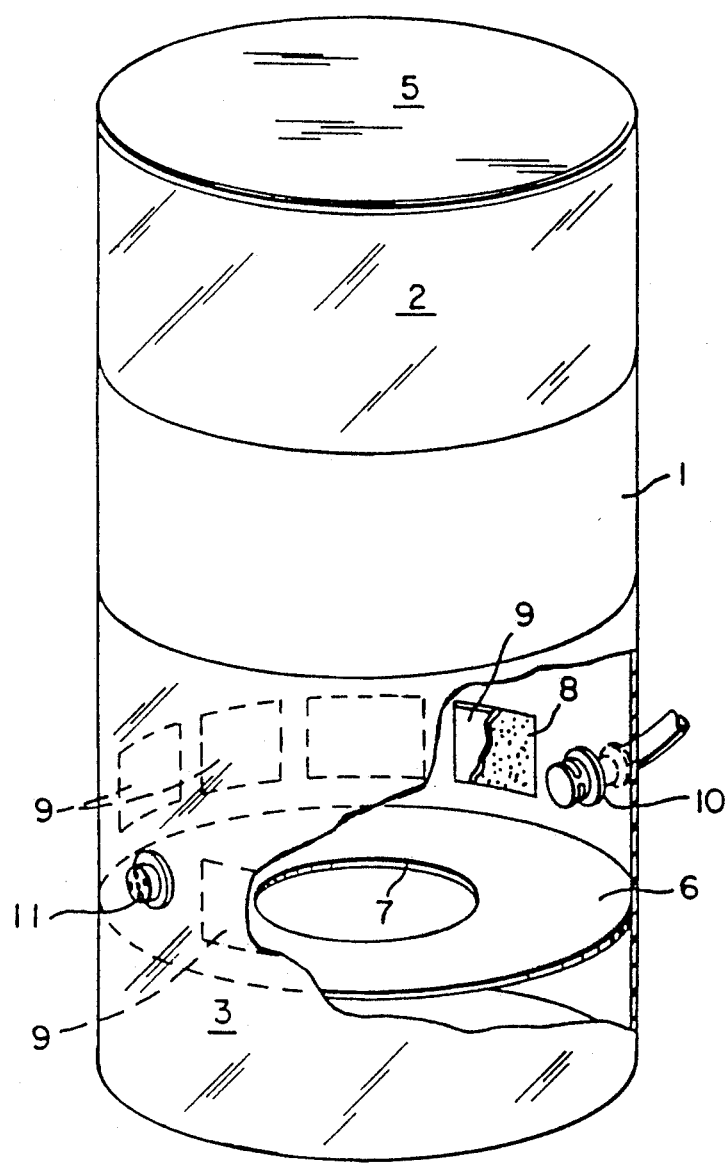
FIG. 1 is a perspective view of a protective hood of the present invention, partly cut away to show the $CO_2$ absorption means disposed inside the hood.

The hoods of the present invention can have the tubular configuration shown in U.S. Pat. No. 4,627,431, with a substantially circular top section attached to a tubular side section. Such a configuration is show in FIG. 1, in which generally tubular portion 1, having upper end 2 and lower end 3, has a continuous sidewall which forms the basic component of the hood. The upper end of the tubular portion is bonded to circular top portion 5. Substantially annular resilient neck seal 6 is attached to the inner side portion of the lower end of the tubular portion, the neck seal having an opening 7 for admitting at least the head of the user to form a closure around the user. $CO_2$ absorption means 8 is encased in envelopes 9 and attached to the interior sidewall of the tubular portion of the hood. If external air sources are intended to be used for the hood, the construction preferably further comprises inflow valve 10 and outflow valve 11.

Figure 2:
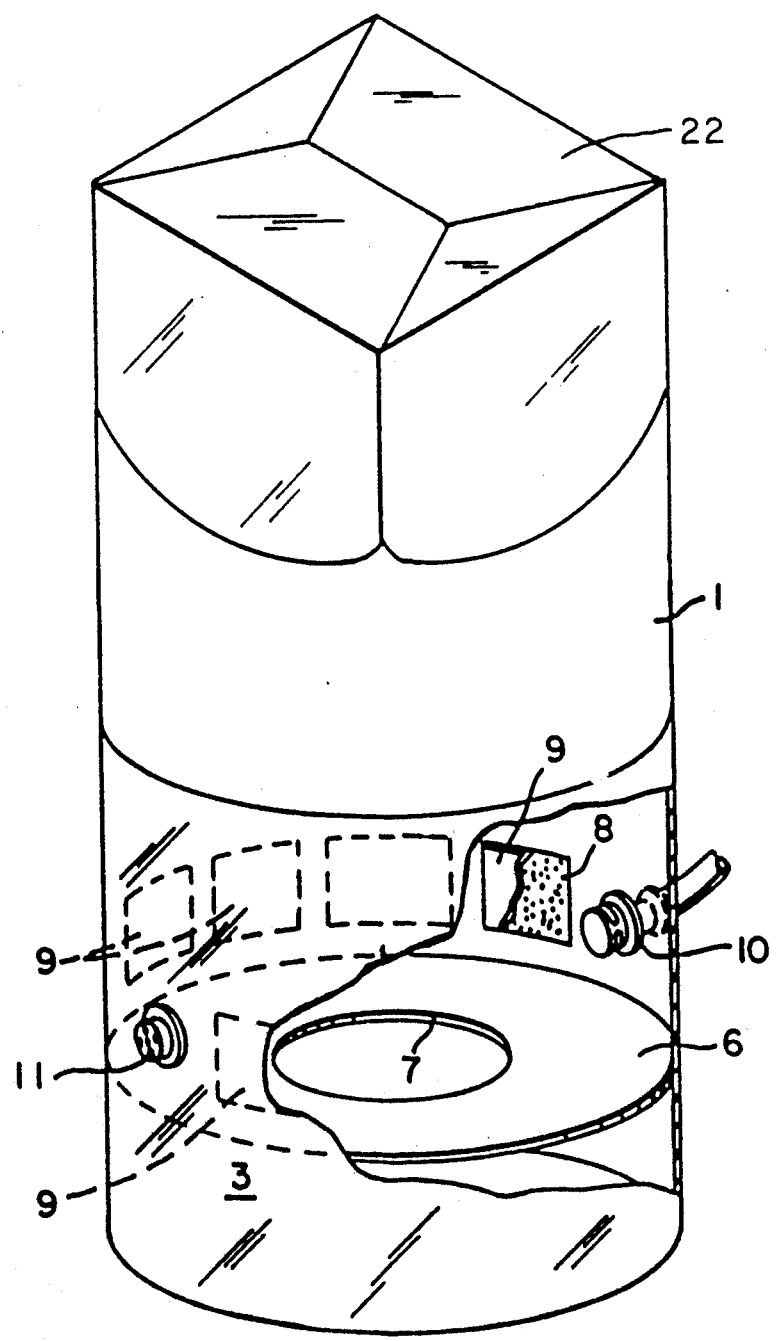
FIG. 2 is a perspective view of another embodiment of the present invention.

Alternatively, the hoods of the present invention can be constructed with a single piece of material, as shown in FIG. 2. There, the closed upper end of the hood 22 is formed by a folded configuration similar to the bottom of a paper bag. This embodiment is preferred for ease of construction.

In FIG. 3, the preferred construction of the $CO_2$ absorption means is shown. There, the absorbant 31 is intimately admixed with fibrous material 32, and disposed in the form of a sheet. Permeable fabric layers 33 and 34 are bonded to each surface of the admixed absorbant and fibrous material.

The compounding of the absorbant with the fibrous component, in accordance with the present invention, substantially reduces the problems associated with dust from the absorbant. The use of paper making techniques allows a uniform distribution of the absorbant within the resultant structure. The layers of fibrous sheet, and especially the preferred materials, add strength and fire resistance. The preferred mechanical treatment insures long term scrubber mechanical integrity and prevents substantial migration or settling of LiOH powder in the scrubber. Since the absorbant is so effectively bound by the fibrous material and the mechanical treatment, the costly envelopes of expanded polytetrafluoroethylene are no longer required. Instead, the sandwich can be inserted into a permeable envelope of sufficient strength for the intended use and inserted into the hood.

The present invention is further illustrated in the following specific example.

EXAMPLE 60 grams of environmental grade anhydrous LiOH powder (6–14 Tyler mesh) was ground to a particle size of about 10 microns in a hammer mill. The LiOH was mixed with polytetrafluoroethylene (TFE) powder (commercially available from E. I. du Pont de Nemours and Co. as "Teflon TFE3512") in a ratio of 98% LiOH, 2% Teflon by weight, at 212 degrees F. for one minute in a high shear Banbury mixer. The resultant mass of material was dispersed in one quart of a hydrocarbon liquid (VM&P Naptha) using a Waring blender and blended to uniformity. The mixture was further diluted with VM&P Naptha to a final quantity of about 3 gallons with stirring adequate to maintain a uniform dispersion.

A 0.9 ounce/square yard, 12"×12" sheet of permeable fabric (commercially available from E. I. du Pont de Nemours and Co. as Nomex spunlaced fabric) was laid onto the screen of a laboratory size paper making machine. The LiOH/Teflon/Naptha slurry was poured in to provide an effective LiOH loading of 60 grams/sq. ft. 15" of mercury vacuum was applied and then the 2 layer structure was pressed at 60 psi. The resulting paper was dried at 230° F. for one hour. Finally, a second 0.9 oz./sq. yd., 12"×12" sheet of spunlaced fabric was added and the entire structure was needled on a Dilo needleloom. Several identical composite sheets were made as described above, pieced together and cut as required (using an industrial-type sewing machine) to form five individual pieces; one about 6"×12, two about 6"×24" and two about 18"×4" The composite sheets were then incorporated into individual 2-layer melt-blown polypropylene envelopes (outer layer 35 grams/square meter, inner layer 20 grams/square meter). The envelope is formed using traditional sewing techniques. Buttonholes were included for ease of attachment in a smoke hood, and additional stitching lines were added to aid folding these scrubbers and placement within the hood.

Emergency life support hoods incorporating the scrubbers were tested, and passed the tests for aircraft crewmembers described in the FAA action notice, A8150.2 of Sep. 1, 1987. The tests model the workload of an aircraft crewmember while putting out an onboard fire.

I claim:

1. In a protective hood for providing a user with breathable air which envelopes at least the head of the user and contains $CO_2$ adsorption means disposed inside the hood, the improvement wherein the $CO_2$ adsorption means is uniformly admixed with about from 0.1 to 70% by weight of the mixture, of a fibrous material, and the $CO_2$ adsorption means is disposed in the form of a sheet having a thickness of about from 1 to 10 mm, the $CO_2$ adsorption means having been prepared by simultaneously fibrilating fluorocarbon resin and compounding with $CO_2$ absorbant with a high shear mixer dispersing the resulting compounded $CO_2$ adsorption means in a fluid which is a non-solvent for both the fibrous material and the $CO_2$ adsorption means, and casting the dispersion into sheet form and removing the non-solvent.

2. A protective hood of claim 1 wherein the sheet has a permeable fabric bonded to at least one surface thereof, the membrane having a pore size of at least about 0.1 micron.

3. A protective hood of claim 2 wherein the sheet has a permeable fabric bonded to both surfaces of the sheet.

4. A protective hood of claim 3 wherein the permeable fabric consists essentially of polyamide spunlaced fabric.

5. A protective hood of claim 3 wherein the permeable fabric consists essentially of polyester spunlaced fabric.

6. A protective hood of claim 3 wherein the permeable fabric consists essentially of polytetrafluoroethylene.

7. A protective hood of claim 1 wherein the $CO_2$ absorption means is selected from the group consisting of alkali and alkaline earth metal oxides and hydroxides.

8. A protective hood of claim 7 wherein the $CO_2$ absorption means consists essentially of lithium hydroxide.

9. A protective hood of claim 1 wherein the fibrous material consists essentially of polytetrafluoroethylene.

10. A protective hood of claim 7 wherein the fibrous material has a fiber length of about from $\frac{1}{8}$ to $1\frac{1}{2}$ inch.

11. A protective hood of claim 1 wherein the sheet has been mechanically treated to improve the stability of the absorbant in the fibrous material.

* * * * *